US010439744B2

(12) United States Patent
Rao et al.

(10) Patent No.: US 10,439,744 B2
(45) Date of Patent: Oct. 8, 2019

(54) APPARATUSES AND METHODS FOR MEASURING TRANSMIT SIGNAL POWER LEAKING INTO ADJACENT RADIO CHANNELS

(71) Applicant: Intel IP Corporation, Santa Clara, CA (US)

(72) Inventors: Jianqiang Rao, Neubiberg (DE); Zhibin Yu, Unterhaching (DE); Bernhard Sogl, Unterhaching (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/811,798

(22) Filed: Nov. 14, 2017

(65) Prior Publication Data

US 2018/0175949 A1  Jun. 21, 2018

(30) Foreign Application Priority Data

Dec. 19, 2016 (EP) .................................. 16205171

(51) Int. Cl.
| | |
|---|---|
| *H04L 25/03* | (2006.01) |
| *H04B 17/354* | (2015.01) |
| *H04B 1/525* | (2015.01) |
| *H04B 17/24* | (2015.01) |
| *H04W 24/10* | (2009.01) |
| *H04B 1/10* | (2006.01) |

(52) U.S. Cl.
CPC .......... *H04B 17/354* (2015.01); *H04B 1/525* (2013.01); *H04B 17/24* (2015.01); *H04W 24/10* (2013.01); *H04B 2001/1045* (2013.01)

(58) Field of Classification Search
CPC . H04W 72/1215; H04W 88/06; H04W 16/14; H04W 24/10; H04W 36/0005; H04W 52/146; H04W 52/243; H04W 52/244
See application file for complete search history.

(56) References Cited

U.S. PATENT DOCUMENTS

| | | | | |
|---|---|---|---|---|
| 8,750,926 | B2 * | 6/2014 | Fu ........................... | H04B 1/406 455/553.1 |
| 2013/0044621 | A1 * | 2/2013 | Jung ................... | H04W 72/082 370/252 |
| 2013/0272260 | A1 * | 10/2013 | Bitran ................... | H04W 76/10 370/329 |
| 2014/0248877 | A1 | 9/2014 | Lee et al. | |
| 2014/0355492 | A1 | 12/2014 | Liang | |
| 2015/0105122 | A1 * | 4/2015 | Wei ....................... | H04W 24/04 455/553.1 |
| 2016/0072530 | A1 * | 3/2016 | El-Hassan ............. | H03F 1/0227 455/114.2 |

* cited by examiner

*Primary Examiner* — Sai Aung
(74) *Attorney, Agent, or Firm* — 2SPL Patent Attorneys PartG mbB

(57) ABSTRACT

The present disclosure relates to an apparatus for a wireless communication system The apparatus comprises transmitter circuitry configured to generate a transmit signal on an assigned radio channel, and transmitter feedback receiver circuitry coupled to the transmitter circuitry and configured to estimate an amount of transmit signal power that leaks into adjacent radio channels based on a fed back version of the transmit signal.

17 Claims, 15 Drawing Sheets

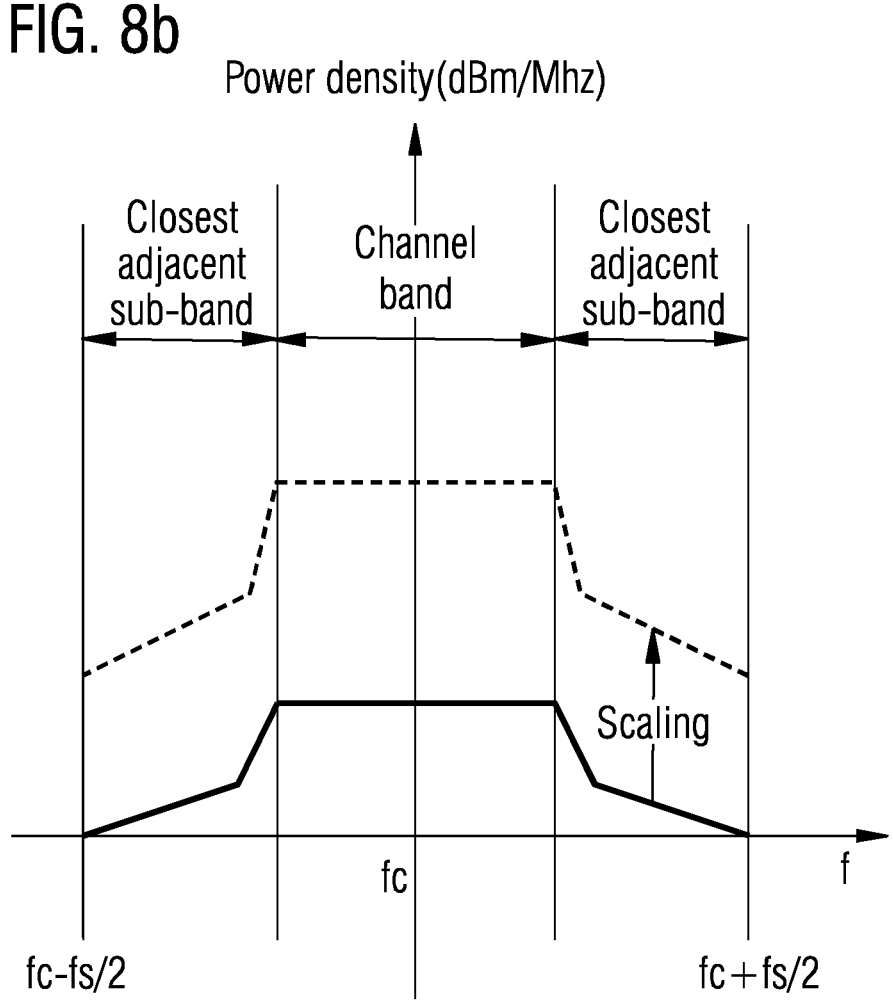

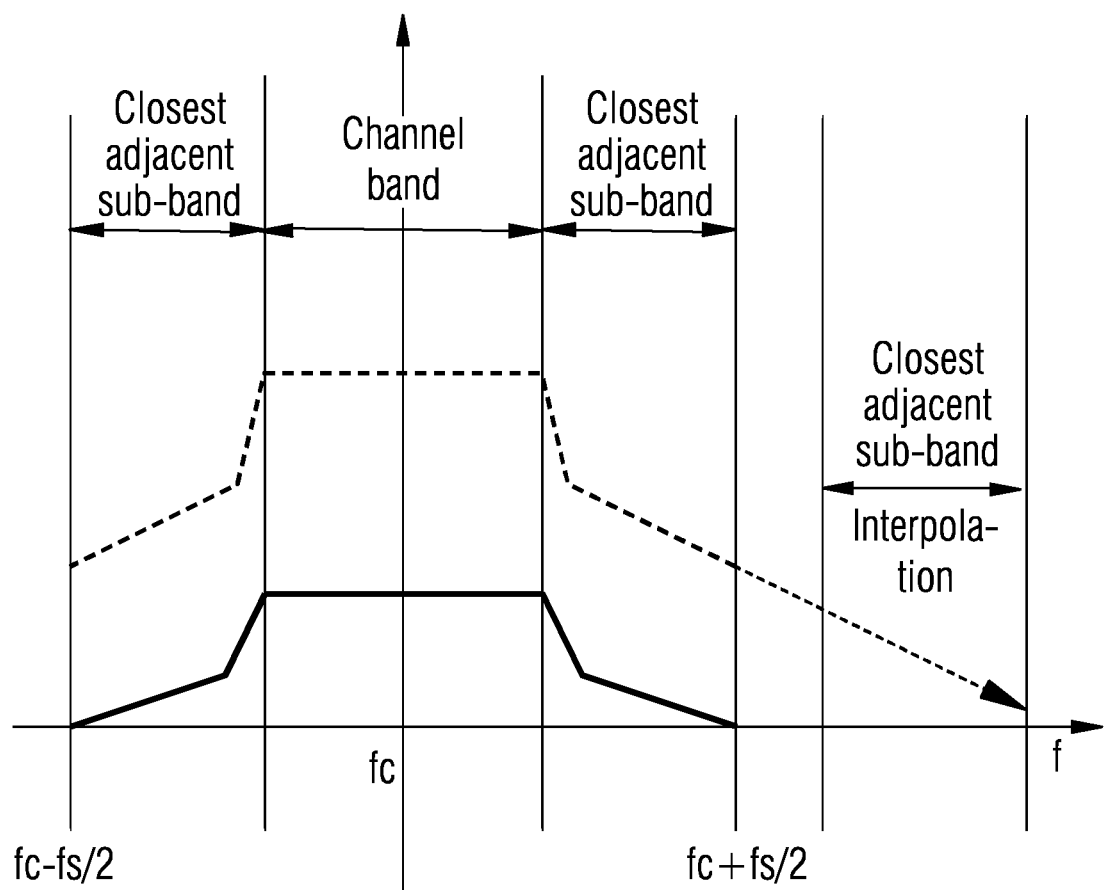

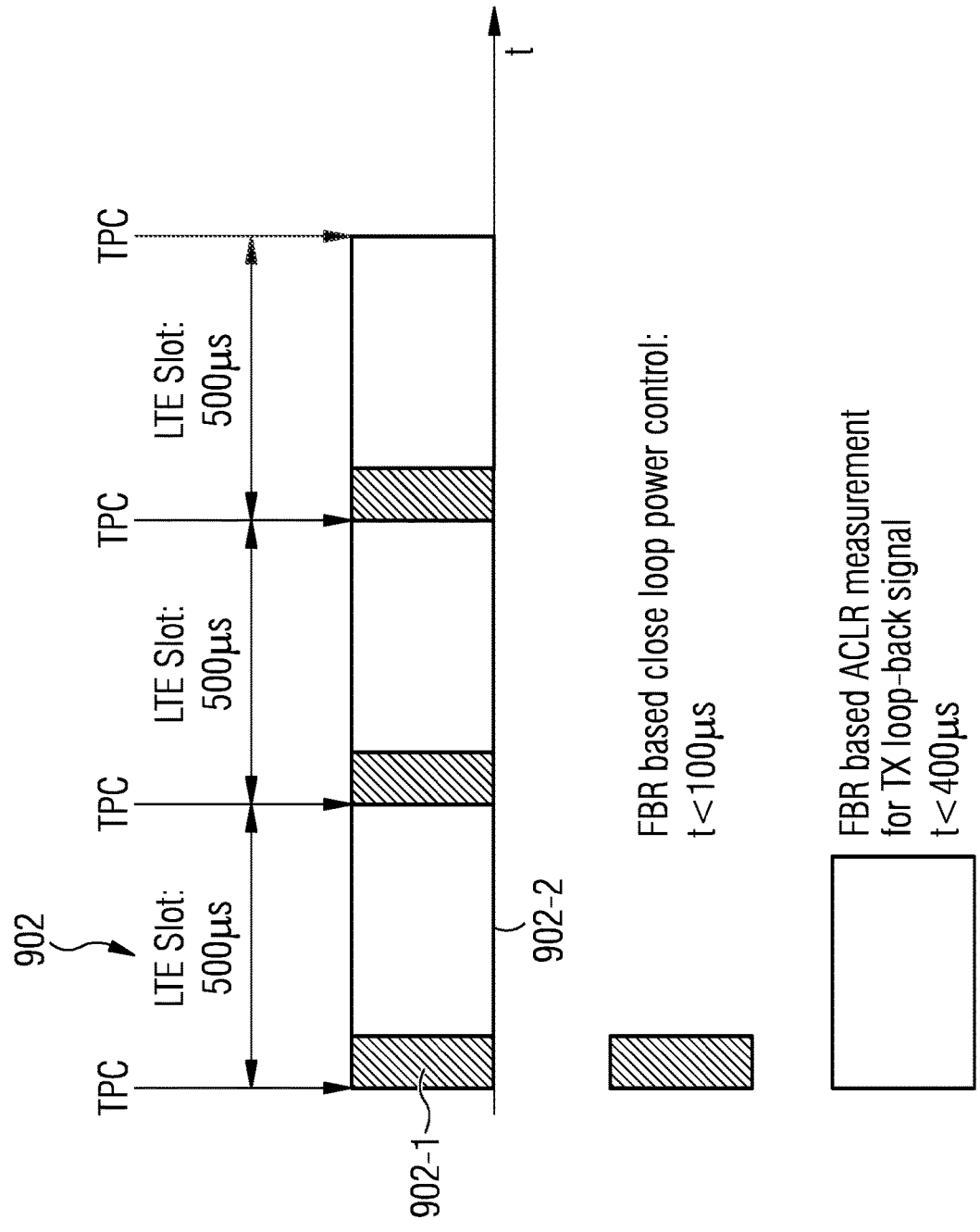

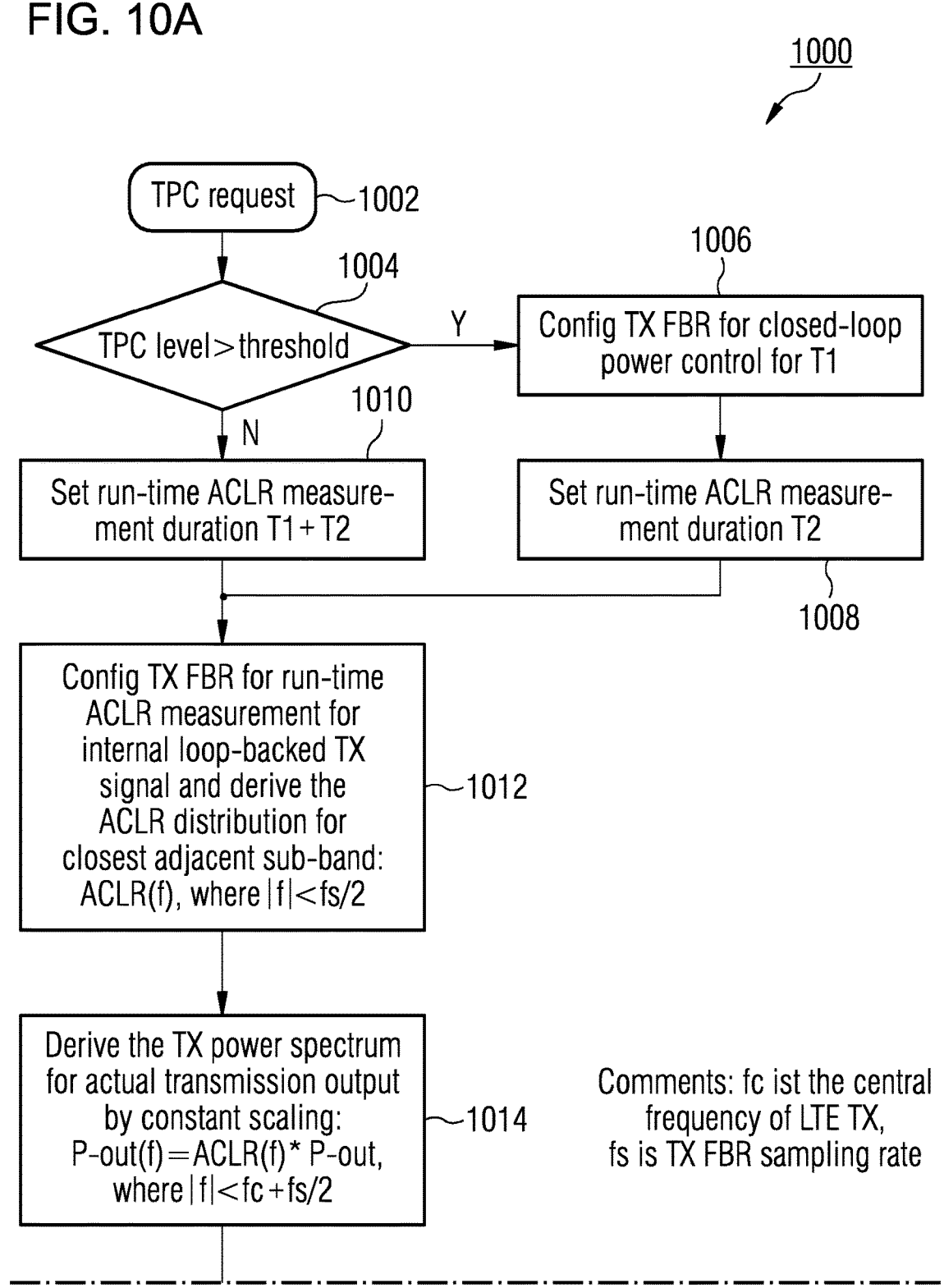

ID CHANNELS

FIELD

The present disclosure generally relates to wireless communication systems and, more particularly, to apparatuses and methods for measuring or estimating transmit signal power leaking into adjacent radio channels.

BACKGROUND

Multi-mode terminals or multi-mode User Equipment (UE) are user terminals which are able to operate via a plurality of different Radio Access Technologies (RATs), such as, for example, Long-Term Evolution (LTE), also commonly referred to as $4^{th}$ Generation (4G), Universal Mobile Telecommunications System (UMTS), also commonly referred to as $3^{rd}$ Generation (3G), Wi-Fi allowing electronic devices to connect to a Wireless LAN (WLAN) according to the 802.11 standards, WiMAX (Worldwide Interoperability for Microwave Access), which is a family of wireless communication standards based on the IEEE 802.16 set of standards, which provide multiple physical layer (PHY) and Media Access Control (MAC) options, or even Global Positioning System (GPS) transceivers capabilities.

Due to extreme proximity of multiple radio transceivers for the different RATs within the same user terminal, the transmit power of a transmitter in accordance with a first RAT may be much higher than a received power level of another receiver accordance with a second RAT. By means of filter technologies and sufficient frequency separation, the transmit signal may not result in significant interference. But for some coexistence scenarios, e.g. different RATs within the same user terminal operating on adjacent frequencies, current state-of-the-art filter technology might not provide sufficient rejection. Therefore, solving the interference problem by single generic Radio Frequency (RF) design may not always be possible and alternative methods needs to be considered.

Thus, there is a need for improved concepts for estimating adjacent channel interference for multi-mode devices.

BRIEF DESCRIPTION OF THE DRAWINGS

Some examples of apparatuses and/or methods will be described in the following by way of example only, and with reference to the accompanying figures, in which

FIG. 8A-C illustrate an example of a proposed three-act method for transmit (TX) adjacent channel leakage power estimation;

FIG. 9 shows a scheduling of a transmitter feedback receiver for run-time ACLR measurement;

DESCRIPTION OF EMBODIMENTS

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

When two radio technologies having adjacent bands operate simultaneously in the same multi-mode device, the Out-Of-Band (OOB) radiations of the transmitting radio leak on the band of the receiving radio due to non-ideal filters. These OOB radiations are commonly referred to as In-Device Coexistence (IDC) interference.

Figure 1:
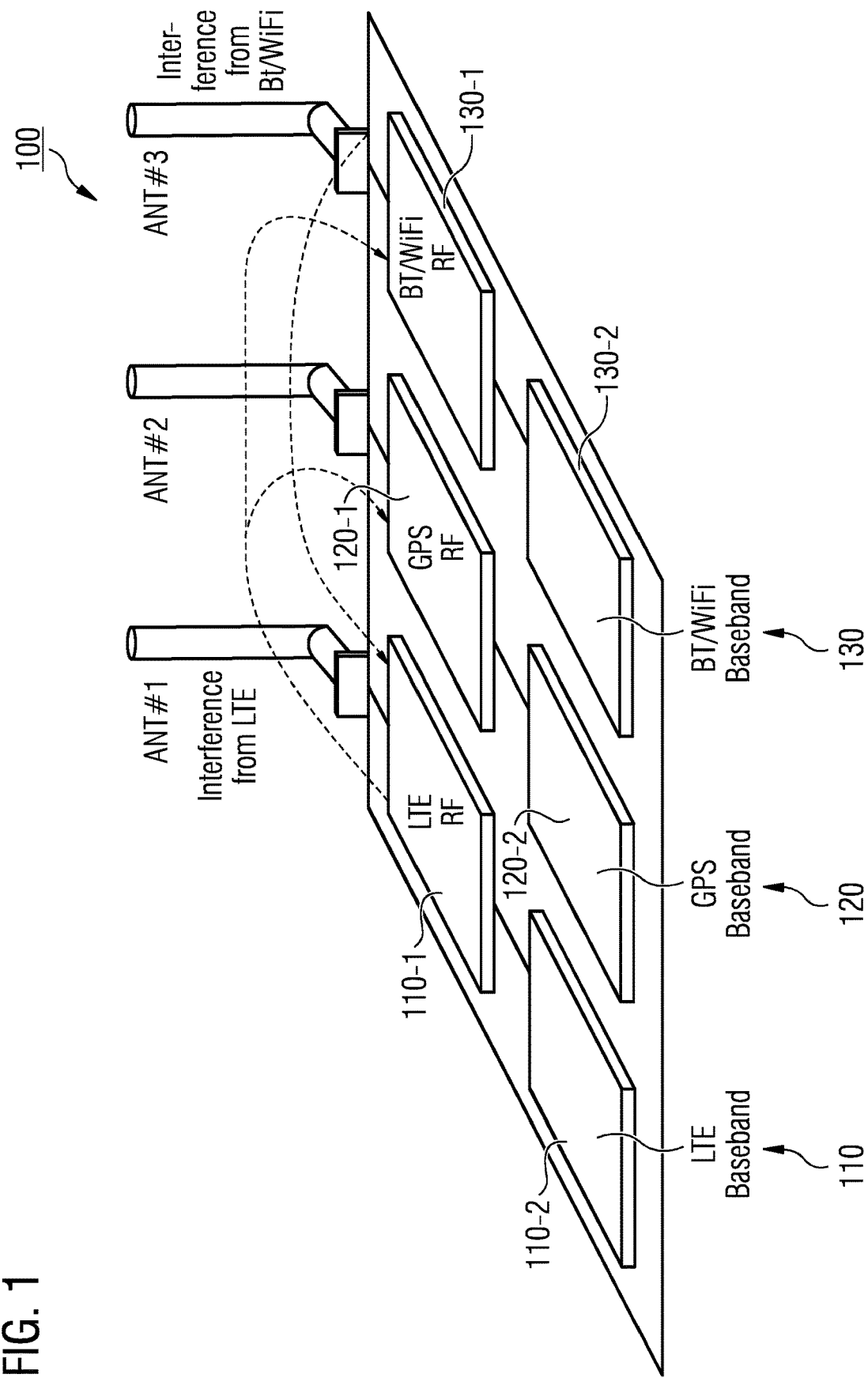
FIG. 1 shows an example of adjacent channel interference scenarios for In-Device Co-existence (IDC)

FIG. 1 schematically illustrates a example of a multi-mode device 100, for example a UE, to which principles of the present disclosure can be employed.

Multi-mode device 100 comprises radios 110, 120, 130 of three different radio technologies. In the present example, multi-mode device 100 comprises LTE RF circuitry 110-1 coupled to LTE baseband circuitry 110-2, GPS RF circuitry 120-1 coupled to GPS baseband circuitry 120-2, and ISM RF circuitry 130-1 coupled to ISM baseband circuitry 130-2. ISM radio 130 may operate according to some Wi-Fi or Bluetooth standard, for example.

LTE radio 110 emitting power into ISM radio's 130-1 channel is commonly referred to as adjacent-channel leakage (unwanted emissions). It occurs for two reasons. First, because RF filters require a roll-off, and do not eliminate a signal completely. Second, due to intermodulation in LTE radio's 110 amplifiers, which cause the transmitted spectrum to spread beyond what was intended. Therefore, LTE radio 110-1 emits some power in the adjacent channel which is picked up by ISM radio 130, and vice versa. ISM radio 130 receives some emissions from LTE radio's 110 channel due to the roll off of ISM radio's selectivity filters. Selectivity filters are designed to "select" a channel. Similarly, LTE RF radio's signal suffers intermodulation distortion passing through ISM radio's RF input amplifiers, leaking more power into adjacent frequencies.

Figure 2:
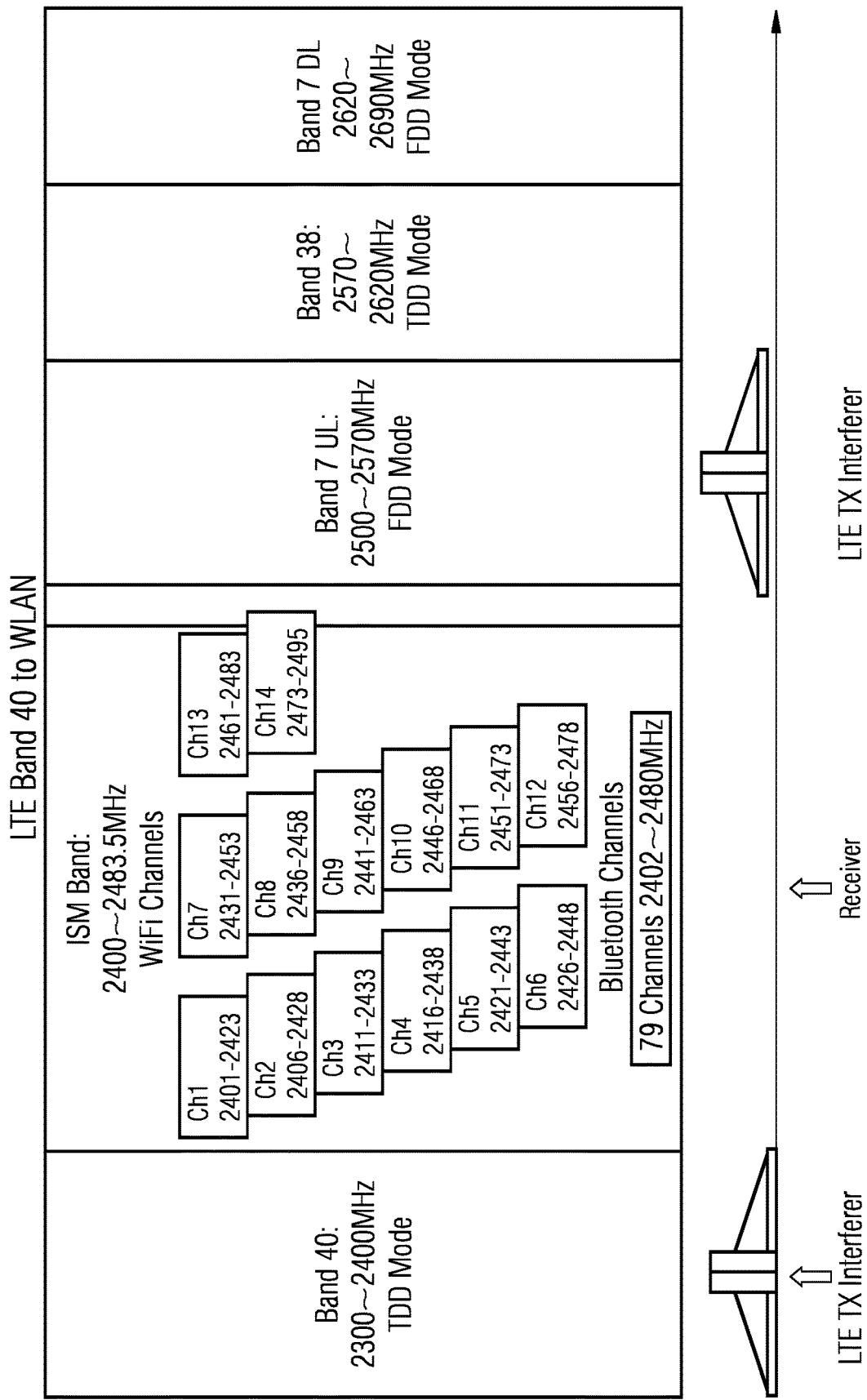
FIG. 2 shows an example where LTE band 40 affects WLAN in the Industrial, Scientific and Medical (ISM) band.

As can be seen from FIG. 2, there are some examples of problematic coexistence scenarios that can arise in multi-mode device 100. For example:

LTE radio 110 transmitting (TX) on LTE Band 40 (2300-2400 MHz) causing interference to ISM radio 130 operating in adjacent ISM bands (2400-2483.5 MHz);

LTE radio 110 transmitting on LTE Uplink Band 7 (2500-2570 MHz) causing interference to ISM radio 130 operating in adjacent ISM bands (2400-2483.5 MHz);

LTE RF radio 110 transmitting on LTE Band 7/13/14 causing interference to GPS radio 120.

There are some existing approaches or proposals to mitigate the LTE TX interference to ISM RX (receiver). For example, when LTE TX adjacent interference to ISM RX is higher than a threshold, one could limit or reduce TX transmission power, blank the TX transmission, or even switch the TX frequency to a different band which is farther away from ISM bands. The assumption for interference mitigation methods are based on the fact that UE could quickly and accurately be aware of the interference level/power from LTE TX to adjacent channels to ISM bands. However, such assumption is defective. The reason is that TX adjacent channel interference power is not constantly proportional with respect to the actual LTE TX transmission power. That is because when transmission power is high, a TX Power Amplifier (PA) is usually operating in its non-linear zone to have the maximal efficiency. The PA non-linear behavior is quite dynamic and is impacted by different variants such as, for example, transmission power levels, transmission frequencies, frequency drifts, uplink resource block (UL-RB) allocations, internal RF TX compensation algorithm performance (e.g. Envelope Tracking (ET), Digital Pre-distortion (DPD)) etc. As a result, UE cannot statically map the TX transmission power value to the TX adjacent channel leakage power value in the dynamical environment.

One existing solution is to apply real-time interference measurement in the receiver path within ISM bands. For example, Signal-to-Noise-plus-Interference Ratio (SINR) measurements by ISM radio 130 and sending the quality metric throughput inter-device messages to LTE radio 110.

However, such an approach has two issues. The signal quality measurement in ISM radio 130 contains the interferences from all parties. It is not possible to separate the contributions generated by co-existence LTE radio 110 from other interferences (for example, the interferences another Wi-Fi user or even the white noise from the environment). In case the ISM RX has poor signal quality but LTE TX adjacent interference is not dominating the interference, by this method the LTE radio 110 will still be asked to take actions to limit/reduce LTE TX power or blank the TX. This would not help ISM RX but would degrade the LTE TX UL throughput. Further, inter-device communication between ISM radio 130 to LTE radio 110 has delays and higher cost (for example, additional interference pins in case ISM radio 130 and LTE radio 110 are not in the same die).

Another approach could be to look-up the interference level based on static assumptions, for example, a look up table which maps some variants (for example, certain resource block allocation pattern vs. transmission power) into an interference value. However, as already mentioned, the PA non-linear behavior depends on so many variants and such methods either lead to a huge look-up tables or inaccurate estimations.

To overcome the mentioned issues, the present disclosure proposes a novel concept of runtime estimation of the adjacent channel interference of a transmitter, which can be a LTE transmitter, for example. The resulting estimate is separated from external interferences. The present disclosure proposes to perform adjacent channel interference measurements using a transmitter FeedBack Receiver (TX FBR). Thereby a TX FBR is an existing component in multiple existing RF transceivers and commonly serves purposes like closed-loop Transmission Power Control (TPC) and/or TX calibration. Thus, a TX FBR usually receives a fed back version of a transmit signal from the transmitter portion of the transceiver. For that purpose, the TX FBR is coupled to the transmitter for feedback—unlike a main receiver of the device. A TX FBR can comprise a full RF receiver chain starting from getting analog RF signals until generating final digitalized Inphase and Quadrature (IQ) data streams.

Figure 3:
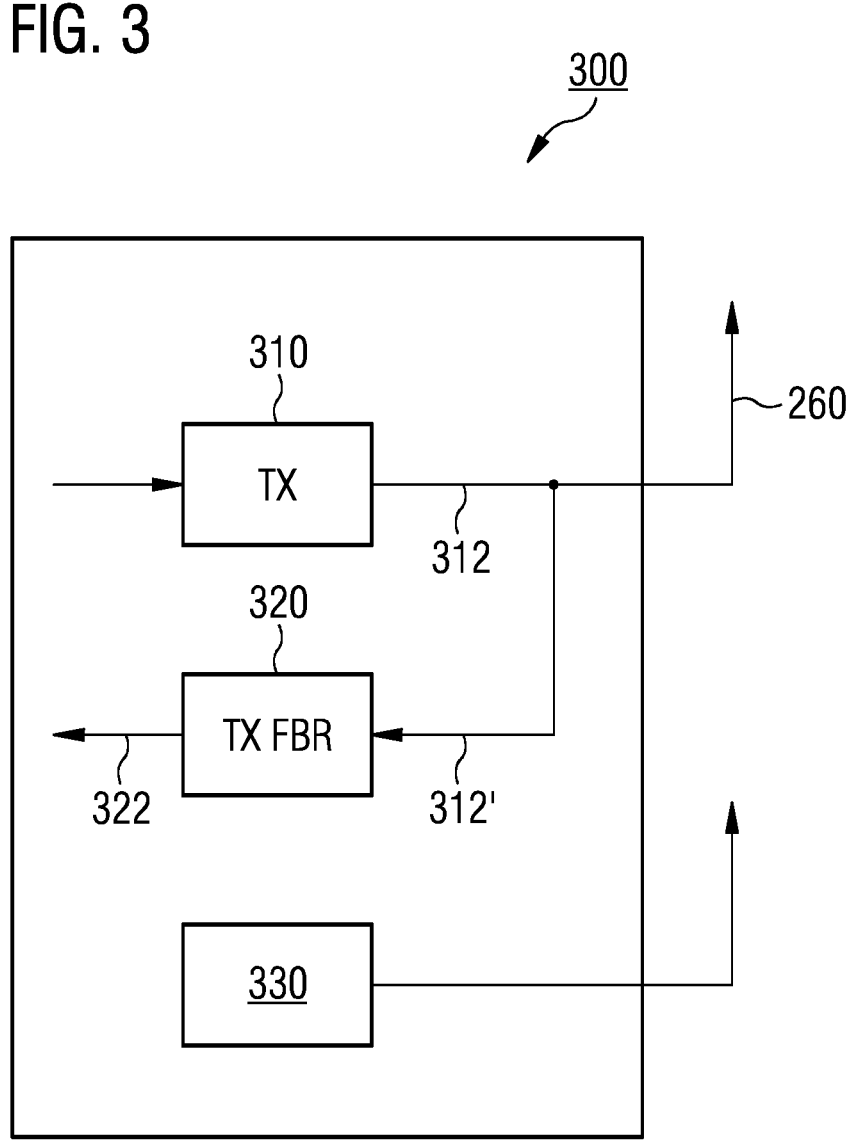
FIG. 3 illustrates an example of an apparatus for a wireless communication system according to the present disclosure.

FIG. 3 illustrates a block diagram of an apparatus 300 for a wireless communication system according to the present disclosure.

Apparatus 300 comprises transmitter (TX) circuitry 310 which configured to generate a transmit signal 312 on an assigned radio channel. Apparatus 300 further comprises transmitter feedback receiver (TX FBR) circuitry 320 being coupled to TX circuitry 310 and being configured to estimate an amount of transmit signal power 322 that leaks into adjacent radio channels based on a fed back version 312' of transmit signal 312. In other words, TX FBR circuitry 320 is configured to perform adjacent-channel interference measurements. The adjacent-channel interference which a receiver "A" experiences from a transmitter "B" is the sum of the power that B emits into A's channel—known as the "unwanted emission", and is commonly represented by the Adjacent Channel Leakage Ratio (ACLR).

Thus, in some examples, the TX FBR circuitry 320 can be configured to generate an ACLR spectrum of the fed back version 312' of the transmit signal.

In some examples, the TX FBR circuitry 320 can comprise Fourier transform circuitry configured to generate the ACLR spectrum based on a Fourier transform (e.g. FFT) of the fed back version 312' of the transmit signal. In other examples, the TX FBR circuitry 320 can comprise analog and/or digital filter circuitry configured to generate the ACLR spectrum based on filtering the fed back version 312' of transmit signal with different bandpass-filters associated with respective adjacent radio channels.

In some examples, the TX FBR circuitry 320 can be configured to scale the ACLR spectrum in accordance with a signal attenuation experienced by the fed back version 312' of the transmit signal while propagating from TX circuitry 310 to TX FBR circuitry 320.

In some examples, the ACLR spectrum 322 is bandlimited in accordance with a sampling rate of the TX FBR circuitry 320. In this case, the TX FBR circuitry 320 can be configured to increase a bandwidth of the ACLR spectrum by extrapolation, i.e., estimating the ACLR spectrum beyond its original observation range.

In some examples, the transmitter feedback receiver circuitry 320 comprises an Analog-to-Digital Converter (ADC) having a sampling rate of at least four times the bandwidth of the assigned radio channel for TX. The higher the sampling rate of the fed back version 312' of the transmit signal, the higher can be the non-extrapolated bandwidth of the ACLR spectrum.

In some examples, the TX FBR circuitry 320 can be configured to generate transmit signal power measurements for adjusting the transmit power according to TPC commands received (e.g. from a base station) during a first mode of operation and to estimate the amount of transmit signal power that leaks into adjacent radio channels during a second mode of operation. The first and second modes of operation may take place subsequently or even simultaneously in some examples.

In some examples, the TX FBR circuitry 320 can be configured to generate the transmit signal power measurements during a first portion of a periodically recurring time slot and to measure the amount of transmit signal power that leaks into adjacent radio channels during a second portion of said time slot.

In some examples, the TX FBR circuitry 320 can be configured to combine different measurements of the amount of transmit signal power that leaks into adjacent radio channels measured in different time slots. For example, the different measurements can be combined to generate an average measurement or estimate.

In some examples, the TX FBR circuitry 320 can be configured to measure the amount of transmit signal power that leaks into adjacent radio channels during a Radio Resource Control (RRC) connected mode. In RRC connected mode the UE has established a RRC connection, in contrast to RRC idle mode (no connection). RRC connected mode can include several state, such as CELL_DCH (Dedicated Channel), CELL_FACH (Forward Access Channel), CELL_PCH (Cell Paging Channel) and URA_PCH (URA Paging Channel).

In some examples, the TX circuitry 310 and the TX FBR circuitry 320 can be both coupled to the same controllable Local Oscillator (LO). In other words, transmitter circuitry 310 and the transmitter feedback receiver circuitry 320 can share a single LO,which can reduce hardware efforts.

It has already been explained that examples of the present disclosure may be particularly useful for multi-mode devices. Thus, in some examples the TX circuitry 310 and the TX FBR circuitry 320 may be conformant with a first RAT (such as LTE, for example) and the apparatus 300 may further optionally comprise transceiver circuitry 330 conformant with at least one second RAT (such as Wi-Fi, WiMAX, GPS or the like).

The skilled person will appreciate that TX circuitry 310 can comprise baseband as well as RF circuitry, including digital and/or analog TX filters, Digital-to-Analog Converters (DACs), one or more local oscillator circuits, one or more power amplifier (PA) circuits, one or more matching networks, and the like. Likewise, TX FBR circuitry 320 can comprise RF circuitry as well as baseband circuitry, including digital and/or analog RX filters, one or more local oscillator circuits, one or more low noise amplifier (LNA) circuits, Analog-to-Digital Converter (ADCs), and the like.

Apparatus 300 can be employed in a UE or mobile terminal used by an end-user to communicate. It can be a hand-held telephone, such as a smartphone, a laptop computer equipped with a mobile broadband adapter, or any other device. It can connect to base stations or NodeB/eNodeB's and/or to Wi-Fi access points, for example.

Figure 4:
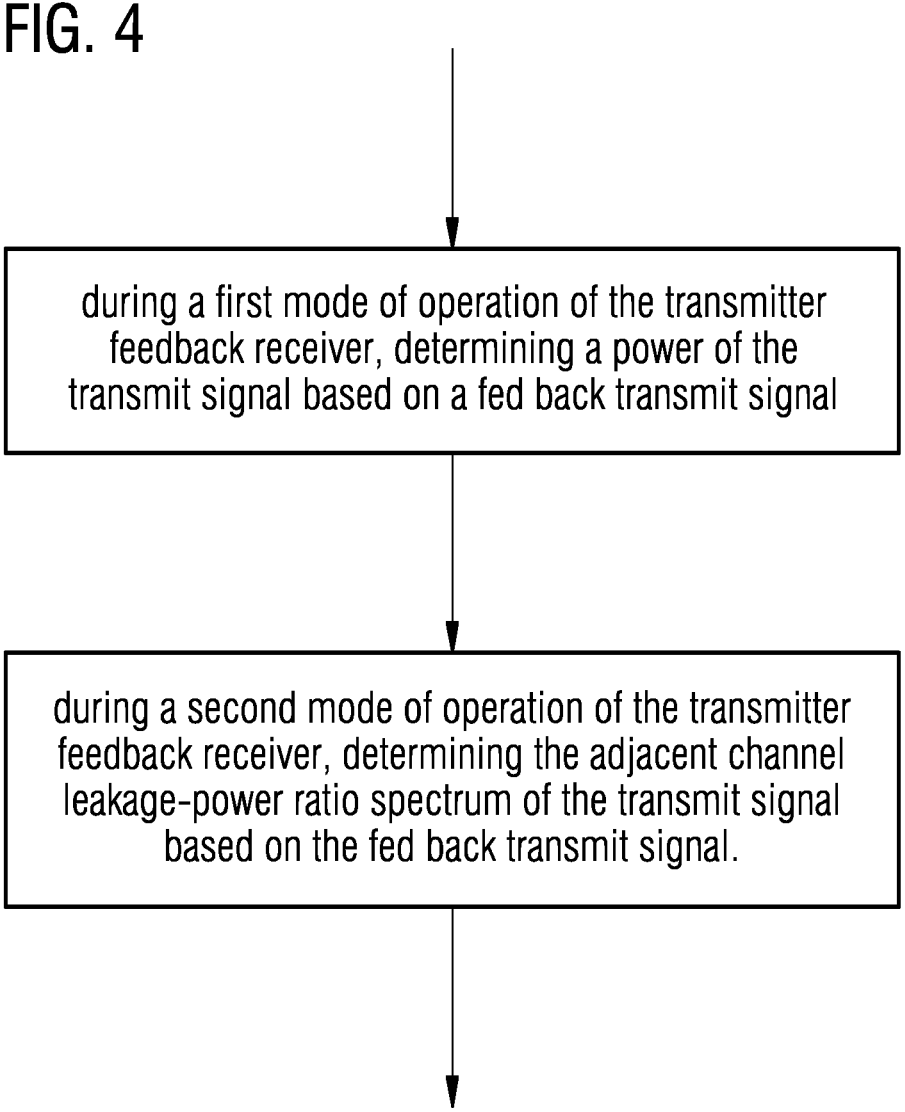
FIG. 4 shows an examples of a method for measuring an Adjacent Channel Leakage-Power Ratio (ACLR) spectrum of a transmit signal of a user equipment of a wireless communication system according to the present disclosure.

The skilled person will appreciate that apparatus 300 can be used to carry out a method in accordance with the present disclosure. An example of such a method 400 for measuring an ACLR spectrum of a transmit signal of a UE of a wireless communication system is shown in FIG. 4. The UE comprises a transmitter 310 configured to generate the transmit signal 312 and a transmitter feedback receiver 320 coupled to the transmitter for feeding back the transmit signal.

Method 400 includes, during a first mode of operation of the transmitter feedback receiver, determining 410 a power of the transmit signal based on a fed back transmit signal 312' and, during a second mode of operation of the transmitter feedback receiver, determining 420 the ACLR spectrum of the transmit signal based on the fed back transmit signal.

To provide a better understanding of the proposed concept, an example of a conventional TX FBR will be described with reference to FIG. 5.

Figure 5:
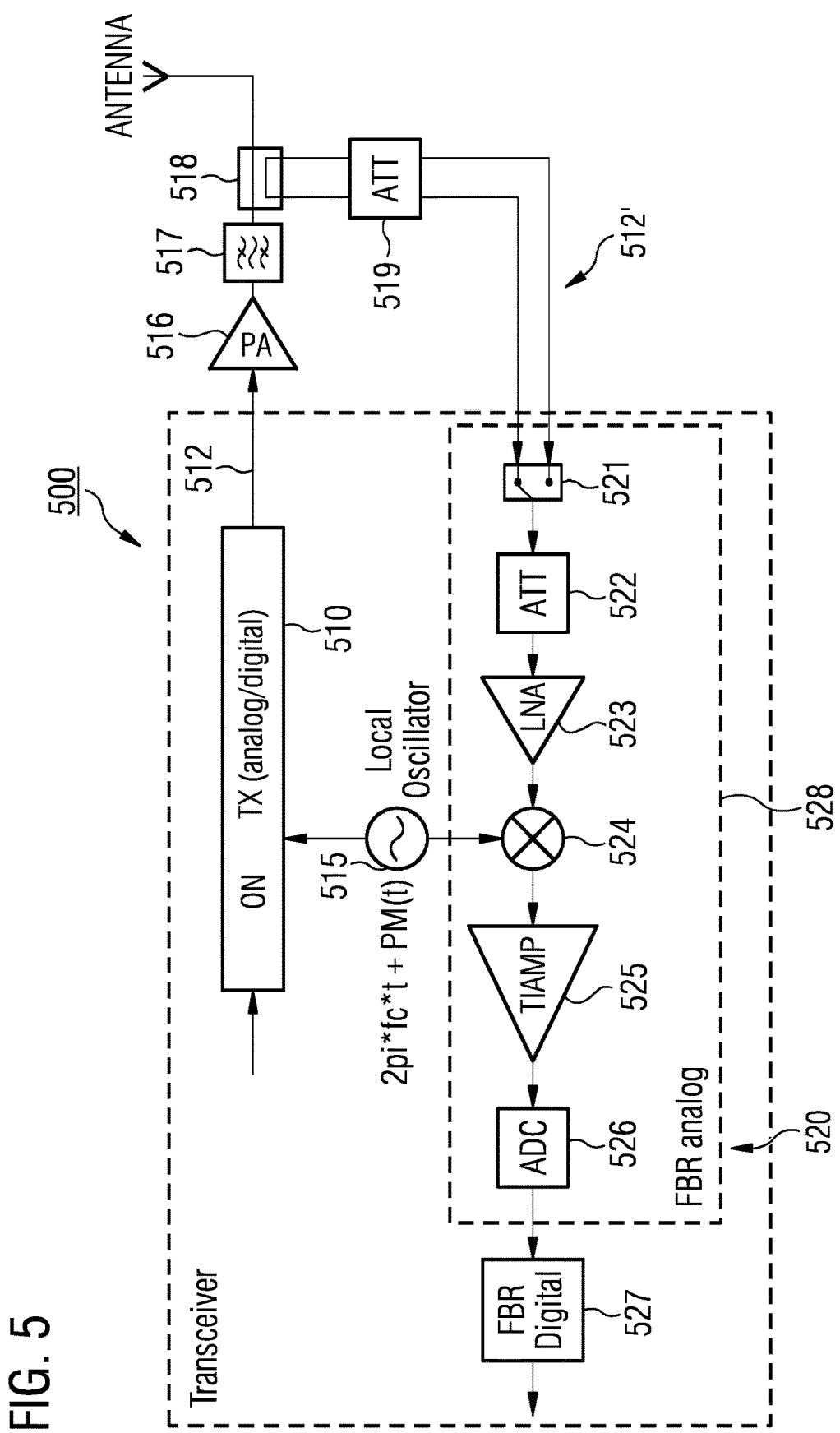
FIG. 5 shows a conventional transmitter feedback receiver design.

FIG. 5 shows a block diagram of a transceiver circuit 500, which can be used in a UE, for example. Transceiver circuit 500 comprises a transmit (TX) portion 510 which is configured to generate an RF transmit signal 512. The skilled person having benefit from the present disclosure will appreciate that TX portion 510 can include digital as well as analog circuit components. For example, baseband signal processing can be performed in the digital domain by using digital hardware components such as Digital Signal Processors (DSPs), Field Programmable Gate Arrays (FPGAs), Application Specific Integrated Circuits (ASICs) or the like. A digital baseband signal can be transformed into the analog domain by using one or more Digital-to-Analog Converters (DACs). In case of polar modulation techniques, the phase PM(t) of an RF signal at frequency $f_c$, which is generated by a controllable local oscillator 515, can be directly modulated. The resulting RF TX signal 512 can be amplified by Power Amplifier (PA) 516 and filtered by a bandpass filter 517 before being radiated via an antenna. The transmit path also includes a directional coupler 518 which is configured to couple a defined amount of the electromagnetic TX power in the TX path to a port enabling the RF TX signal to be fed back to TX FBR 520. Thus, TX FBR 520 is coupled to TX portion 510 via coupler 518. A first attenuator (ATT) 519 can be used to decrease the power of the fed back RF TX signal.

The example TX FBR 520 comprises an analog direct demodulator and a digital frontend 527 for data post-processing. The analog demodulation path includes a switch 521 for selecting or bypassing the first attenuator (ATT) 519. The selected signal is fed to a second attenuator (ATT) 522 for input power levelling followed by a Low-Noise Amplifier (LNA) 523. A mixer 524 for down-converting the output signal of LNA 524 is driven by local oscillator 515 tuned to the channel frequency fc and typically containing the modulated phase signal PM(t) on top. Thus, transmitter feedback receiver 520 uses RF TX signal 512 for down-converting the fed back RF TX signal 512'. In other words, TX FBR 520 and transmitter 510 share the same LO 515. A Trans Impedance Amplifier (TIAMP) 525 can be used for fine-tuning the input signal amplitude of the down-converted signal to provide a full-scale baseband signal to Analog-to-Digital Converter (ADC) 526.

Conventionally, transmitter feedback receiver 520 is operated together with TX portion 510 and used mainly for power measurements in TX transmission mode (first mode). To fulfill power control requirements, the transmitter feedback receiver gain can be fixed for each Frequency Band and RAT (Radio Access Technology).

Figure 6A:
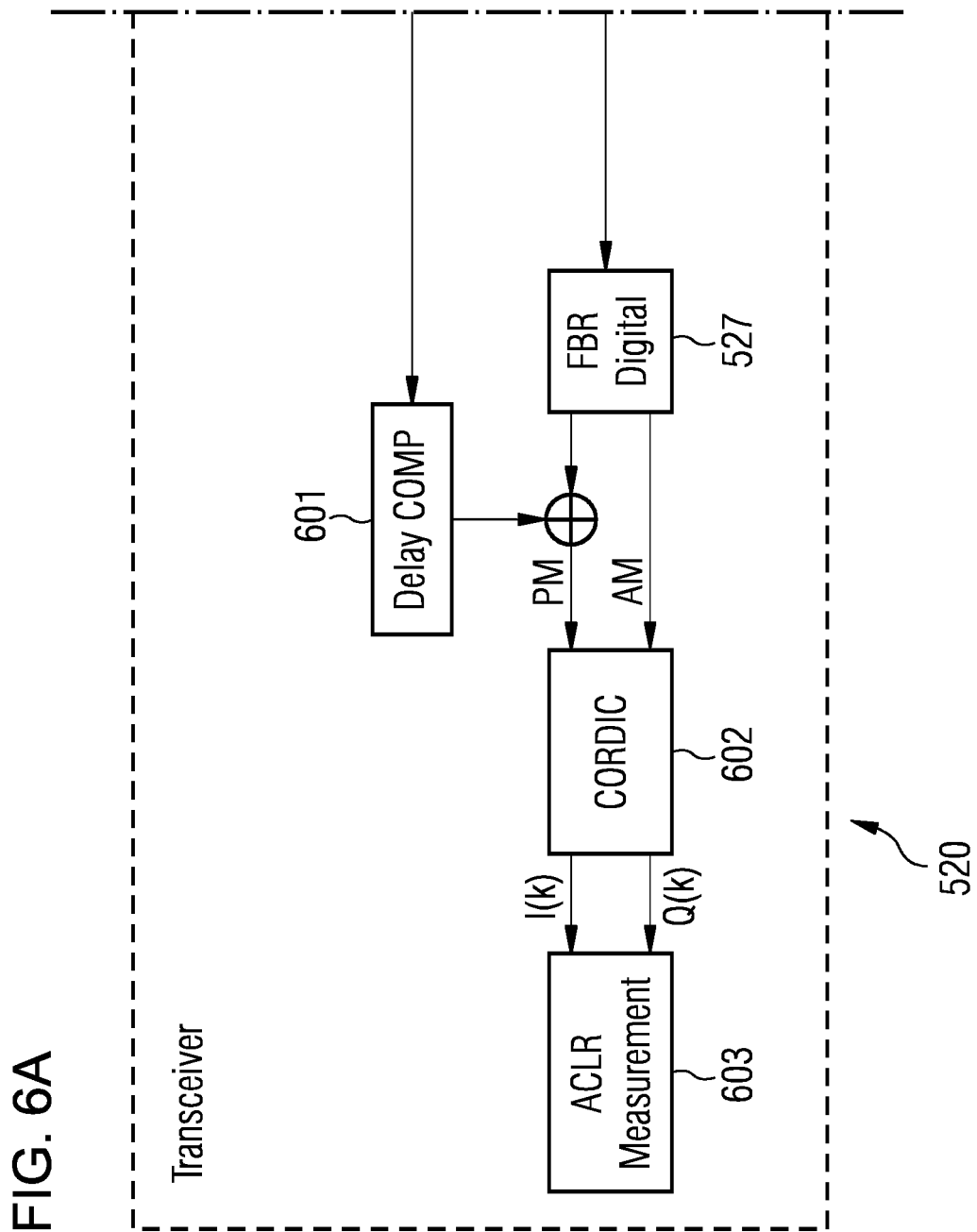
FIG. 6 is composed of FIGS. 6A and 6B, forming a single image, which shows a transmitter feedback receiver design according to an example of the present disclosure.
Figure 6B:
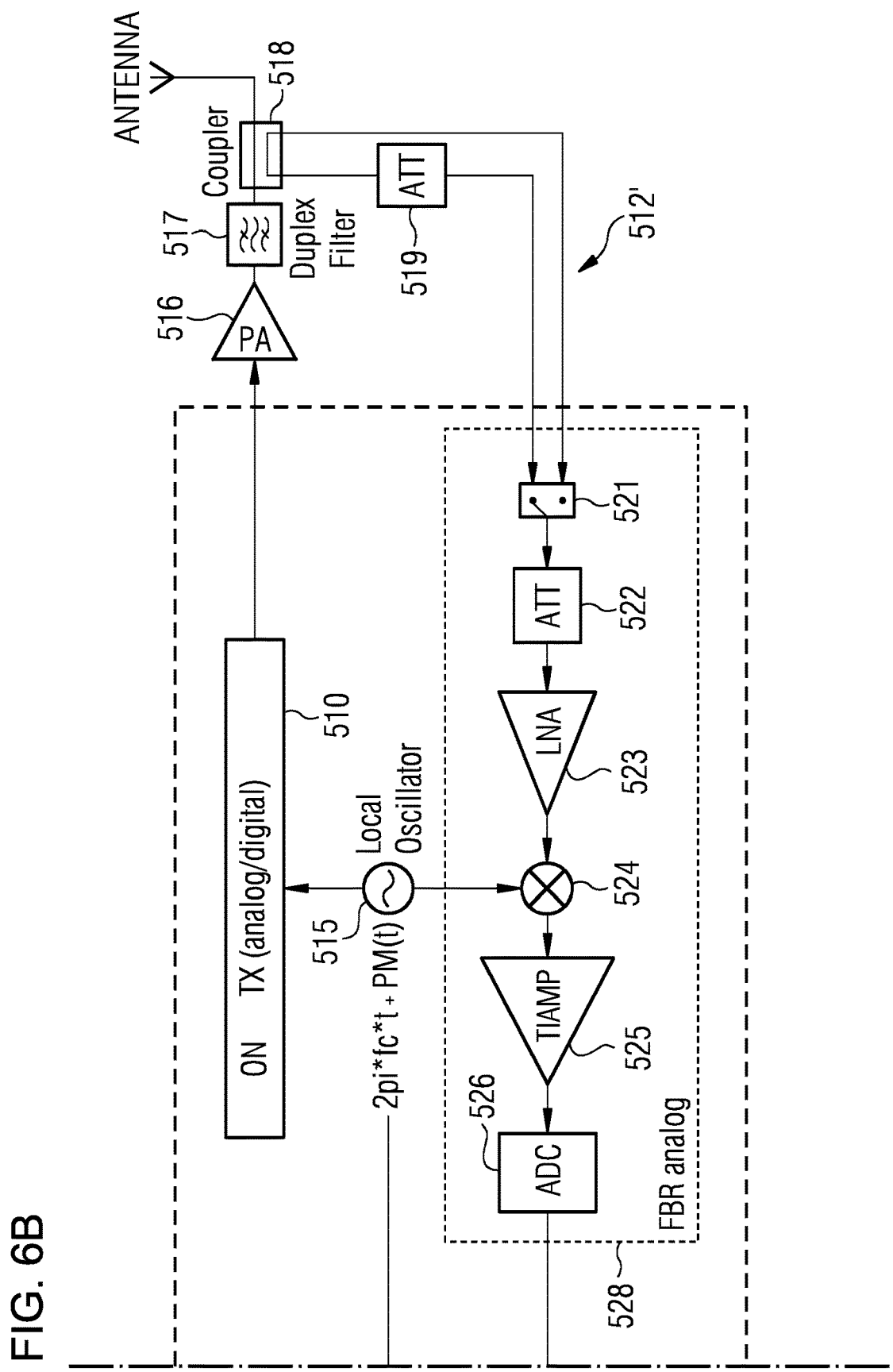

In the example of FIG. 5, the TX architecture comprises a polar transmitter, i.e. the local oscillator 515 is containing the phase modulation of the transmit signal PM(t) which can distort the signal demodulation in TX FBR 520 since differences in path delays between the transmit signal and the fed back transmit signal are typically present. These delay differences, even when small, can diminish the accuracy and usefulness of feedback information, specifically when using a phase modulated LO to generate the feedback phase information. Thus, undistorted signal demodulation while simultaneously transmitting might not be possible with the illustrated polar architecture. Although the amplitude (AM) of the down-converted signal would be undistorted, the phase (PM) of the down-converted signal would be distorted. Thus, in case of a phase modulated LO signal, as it is the case for polar transmitter architectures, the phase of the FBR demodulated signal can be reconstructed by an additional digital signal processing block 601, which is shown in the example implementation of FIG. 6.

In the illustrated example, digital frontend 527 generates an output for Amplitude Modulation (AM) signal components an output for Phase Modulation (PM) signal components. As mentioned before, while the AM signal components can be considered essentially undistorted, the PM signal components come out distorted due to signal propagation delays A RF signal propagation delay $T_{RF1}$ from the phase modulated LO 515 to the demodulator or mixer 524 of TX FBR 520 can be referred to as first RF delay, while a roundtrip propagation delay $\tau_{RF2}$ from the RF transmit signal 512 to TX FBR 520 can be referred to as second RF delay. The delay difference between the first RF path delay and the second RF path delay can result in unwanted TX FBR phase signal variations and can degrade the overall signal quality dramatically. The delay difference between the first RF path delay and the second RF path delay is referred to as RF delay and denoted as $\tau_{RF}$.

The delay compensation component 601 receives the PM signal and generates a compensated PM signal. The compensated PM signal provides a measurement of phase shift(s) with enhanced accuracy because the delay compensation component 601 compensates for the RF delay differences. The compensation signal is added to the PM signal by the adder to generate the compensated PM signal can be expressed as:

$$\phi_{TX}(t-\tau)-\phi_{TX}(t-\tau-\tau_{RF}),$$

where $\phi_{TX}$ represents the analog PM signal of the transmitter and $\tau=\tau_{FBR}+\tau_{LOFBR}\cdot\tau_{LOFBR}$ can be expressed as $\tau_{LOFBR}=\tau_{TX}+\tau_{RF1}$, wherein $\tau_{TX}$ represents an internal polar modulator phase delay of the of the transmitter. Thus, delay compensation block 601 realizes $\phi_{TX}(t-\tau)-\phi_{TX}(t-\tau-\tau_{RF})$. This processing is important because in the mentioned scenario the FBR 520 tries to demodulate both AM and PM signals of the looped-back TX signal 512' when TX transmission is on. The TX architecture is a polar transmitter, i.e. the Local Oscillator is containing the phase modulation of the transmit signal PM(t), which distorts the phase of received signal demodulation in the FBR 520. With the phase compensation of digital block 601, the phase distortion can be reverted and therefore AM/PM signals can be demodulated.

The demodulated and compensated AM/PM samples are further transformed through a CORDIC (COordinate Rotation DIgital Computer) processor 602, which transforms the AM/PM samples in to Cartesian Inphase (I) and Quadrature (Q) samples, which can then be directly used for ACLR measurement in ACLR measurement block 603. The skilled person having benefit from the present disclosure will appreciate that delay compensation block 601 and CORDIC hardware 602 could be omitted for transmitter implementations using I/Q modulation, for example. Thus, the proposed concepts are not restricted to Polar transmitters but also applicable to I/Q transmitters.

Figure 7:
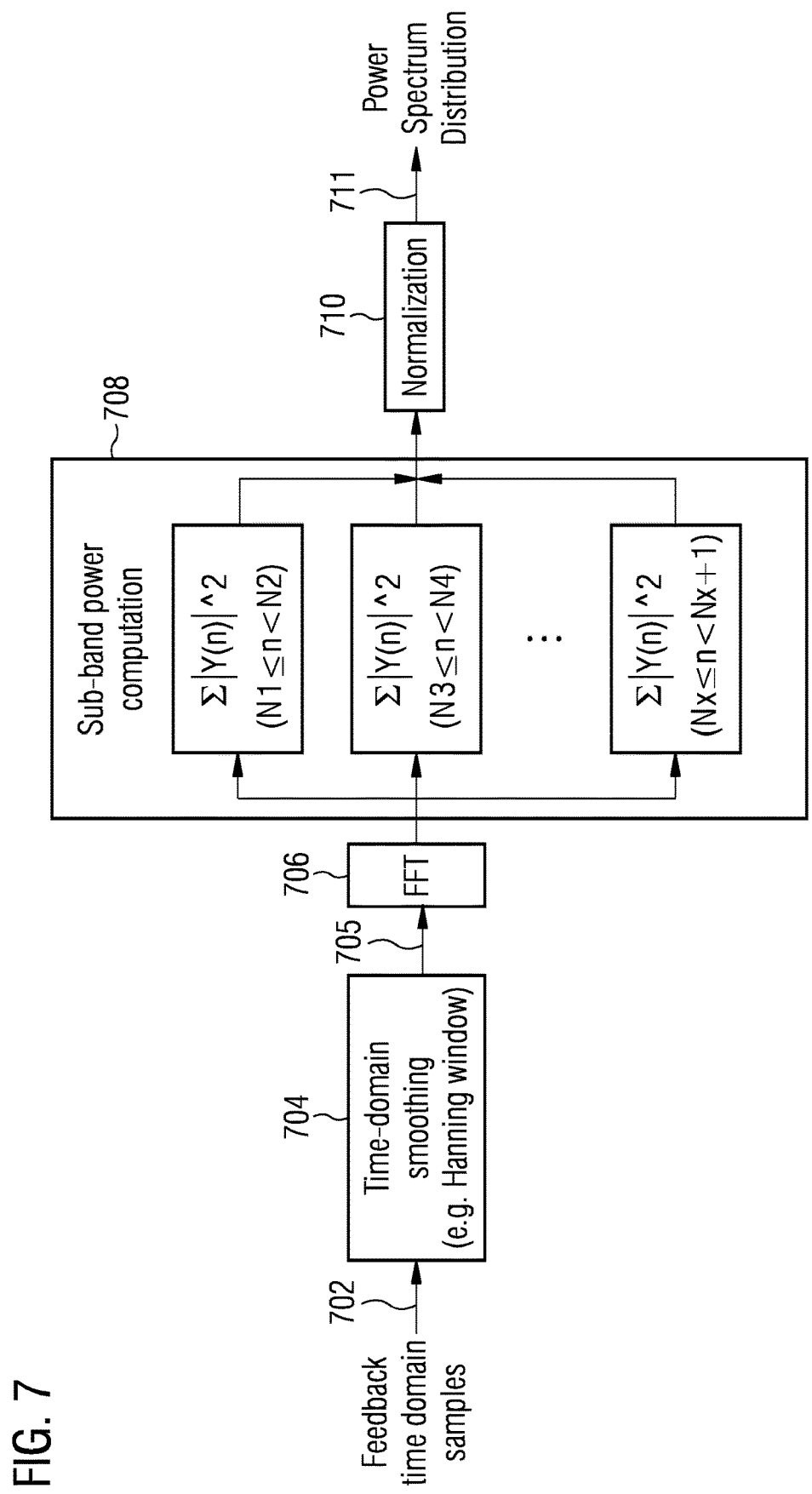
FIG. 7 illustrates an example concept for ACLR spectrum computation.

ACLR measurement block 603 could be implemented in various ways. For example, ACLR measurement block 603 could be configured to generate the ACLR spectrum based on a Fast Fourier transform (FFT) of the digital IQ samples of fed back transmit signal 512'. This working principle is illustrated in FIG. 7.

The digital IQ samples 702 of fed back transmit signal 512' can optionally be smoothened by applying a window function 704 to the digital IQ samples 702. This window function could be a Hanning or Hamming window function, for example. Other window functions are also possible. The smoothened signal 705 can then be transformed from time to frequency domain by FFT processor 706. The skilled person having benefit from the present disclosure will appreciate that the spectral components of the digital IQ samples will be dependent on the sampling rate of ADC 526. The higher the sampling rate, the higher will be the spectral components contained by the digital IQ samples. In other words, the ACLR spectrum will be bandlimited in accordance with the sampling rate of the transmitter feedback receiver circuitry 520. It is proposed that ADC 526 should have a sampling rate of at least four times the bandwidth of the assigned TX radio channel. For example, if the TX channel bandwidth is 5 MHz, the sampling rate should be at least 20 MHz. Or, if the TX channel bandwidth is 20 MHz, the sampling rate should be at least 80 MHz. Higher ratios between ADC sampling rate and assigned TX radio channel bandwidth can be beneficial.

The output of the FFT block 706 can be separated into frequency sub-bands. The respective powers of these sub-bands can be computed in block 708. The respective sub-band powers can then be normalized 710 to the sub-band power measured for the assigned TX radio channel, for example, to obtain an initial (ACLR) power spectrum distribution 711.

The skilled person having benefit from the present disclosure will appreciate that there are various methods for ACLR measurement that can be used. In another example, the TX FBR circuitry 320, 520 could comprise analog and/or digital filter circuitry configured to generate the ACLR spectrum based on filtering the fed back transmit signal 312'; 512' with different bandpass-filters associated with respective adjacent radio channels of interest. The powers of the respective filter outputs could then be used for generating the ACLR power spectrum.

In yet another example, the TX FBR IQ samples 702 could also be further routed into a main baseband processor to re-use its strong baseband processing capability (for example FFT hardware and/or FIR filter hardware) to achieve higher ACLR measurement accuracy.

Figure 8A:
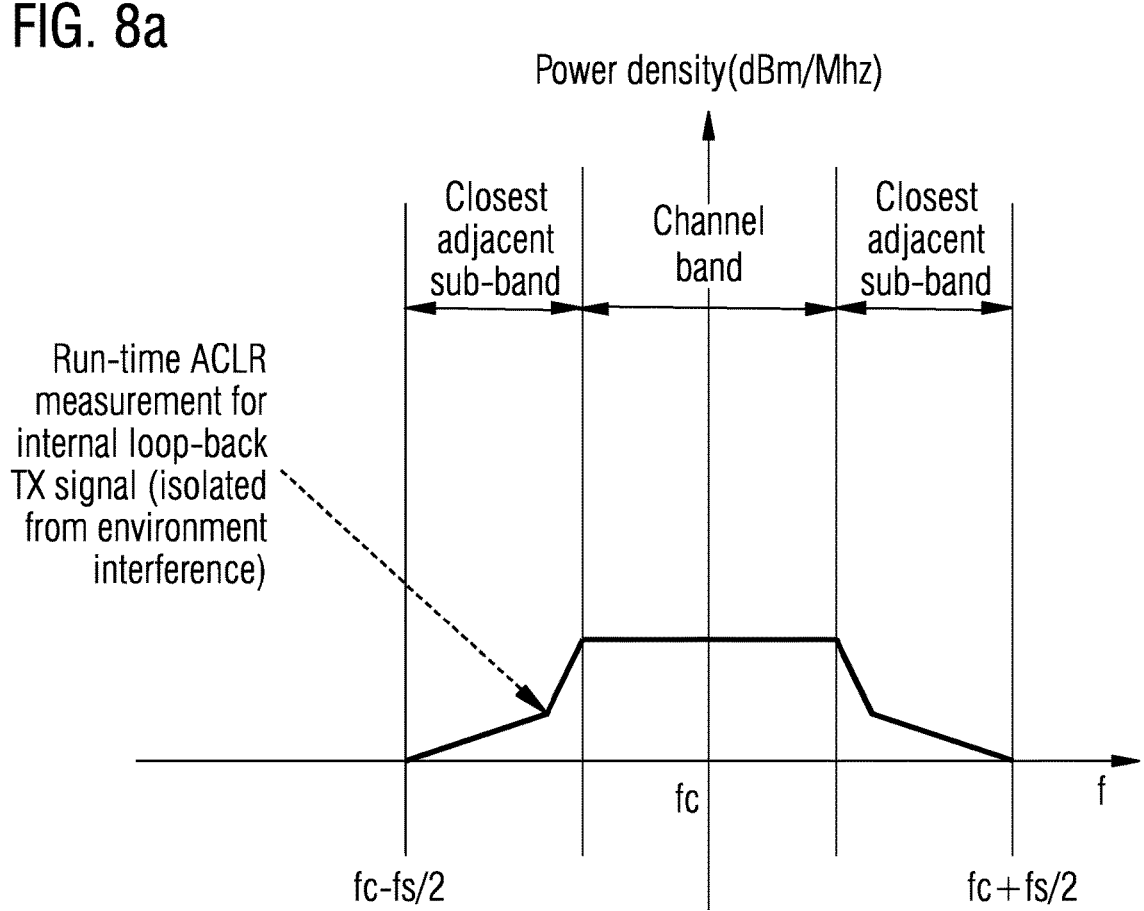

An example of an initial (unscaled) ACLR power density distribution is shown in FIG. 8A. Here, the initial ACLR power density distribution obtained via run-time ACLR measurement by TX FBR 520 comprises a spectral power density distribution over a bandwidth corresponding to the sampling frequency fs of ADC 526. The initial ACLR power density distribution comprises the TX channel and one or more closest adjacent frequency bands.

The skilled person having benefit from the present disclosure will appreciate that the initial ACLR power density distribution measured by the via TX FBR 520 does not correspond to the true ACLR power density distribution of TX signal 512 since the fed back transmit signal 512' gets attenuated while propagating through coupler 518, attenuators 519, 522, etc. This attenuation experienced by the fed back transmit signal 512' can be compensated for by scaling the initial ACLR spectrum 711 in accordance with the signal attenuation experienced by the fed back transmit signal. This is shown in FIG. 8B. At can be assumed that the signal attenuation is known, e.g. by initial measurements or by comparing the TX signal with the fed back TX signal.

As has been explained before, the (scaled) ACLR spectrum is bandlimited in accordance with the sampling rate fs of TX FBR circuitry 520 (or its ADC 526). Thus, the TX FBR circuitry (or its ACLR measurement block 603) can be configured to increase the bandwidth of the (scaled) ACLR spectrum by extrapolation to further adjacent frequency bands of interest outside the measurement bandwidth fs. This is shown in FIG. 8C. Different types of extrapolation are conceivable depending on the shape ACLR spectrum. A simple example would be a linear extrapolation.

To summarize, transceiver 300, 500 can apply run-time TX ACLR measurement making use of the feedback TX signals from TX Feedback Receiver (FBR) 320, 520 while being in one of the states of RRC connected mode, such as, for example, CELL_DCH. Here, the clue is that the feedback TX signals are within the internal TX feedback loop, so that the TX feedback signal 312', 512' is isolated from the external interferences by the front end coupler 518. The measured ACLR generates a run-time power leakage spectrum distribution of the TX loop-back path. A linear scaling based on the ratio between the actual transmission power and the coupled-back power generates the run-time power leakage spectrum distribution at the TX antenna side. Note that the derived TX power leakage spectrum is still bandlimited (limited to the closet adjacent sub-bands due to limited sampling rate). The leakage power spectrum estimation range can be expanded by applying extrapolation using the leakage TX power spectrum distribution within the closest adjacent sub-bands to other adjacent sub-bands. After that, the whole power spectrum from TX adjacent power leakage can be derived.

Information on the measured ACLR spectrum can then be used as a basis for further actions and/or can be exchanged between different radios of the multi-mode device. For example, the transmitter parameters can be adjusted with respect to second transceiver circuitry of the UE conformant with at least one second RAT and/or TX/RX parameters of the second transceiver circuitry can be adjusted.

FIG. 9 shows an example run-time scheduling of TX FBR for run-time ACLR measurement. Note that different from ACLR measurement for factory self-testing, in the proposed concept, ACLR measurement can be scheduled on the fly (e.g. in RRC connected mode) in order to run-time detect the TX adjacent channel power leakage from LTE bands to ISM bands. This can be done by making use of a time gap when TX is on but TX FBR is not needed for closed-loop power control. As shown in the example of FIG. 9, this is actually the worst case condition where TX is requested to apply Transmission Power Control (TPC) every LTE slot and each TPC is operating at high transmission power so TX FBR is needed for closed-loop power control. Luckily closed-loop power control is activated only for only a small portion of one slot (e.g. 100 μs out of 500 μs). Thus, the remaining 400 μs can be used to FBR based ACLR measurement for the looped-back TX signal.

Thus, during a first mode of operation of the TX FBR, a power of the transmit signal can be determined based on the fed back transmit signal. During a second mode of operation of the TX FBR, the ACLR spectrum of the transmit signal can be determined based on the fed back transmit signal. In the first mode of operation, the TX FBR generates transmit signal power measurements for adjusting the transmit power according to received TPC commands during a first portion 902-1 of a periodically recurring time slot 902. In the second mode of operation, the TX FBR can measure the ACLR spectrum during a second portion 902-2 of the time slot.

Note that combining the ACLR measurement results over several ACLR measurements across multiple TPC slots 902 is possible to get better accuracy. Thus, in some examples, the TX FBR circuitry can be configured to combine different measurements of the amount of transmit signal power that leaks into adjacent radio channels measured in different time slots 902. For example, the different measurements can be combined to generate an average ACLR measurement or estimate.

Figure 10B:
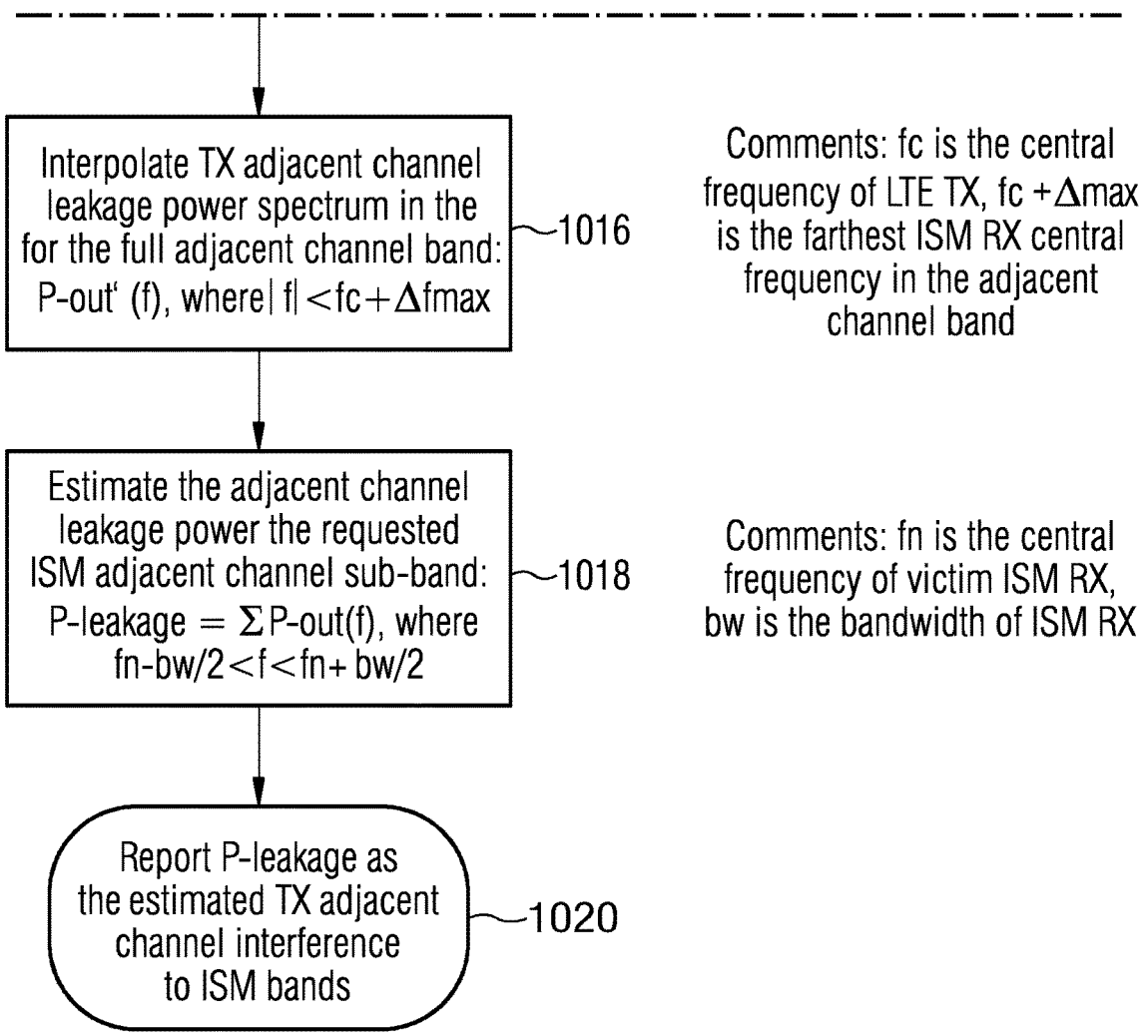
FIG. 10 is composed of FIGS. 10A and 10B, forming a single image, which shows a flowchart of a run-time ACLR measurement.

Turning now to FIG. 10, it is illustrated a flowchart of an example procedure 1000 according to the present disclosure.

In procedure 1000, the LTE RF transceiver receives a TPC requests every LTE uplink slot (1002). If the requested power is higher than a predefined threshold (see 1004), LTE RF transceiver operates the closed-loop power control mode, where TX FBR is activated for power feedback for a short period of time to stabilize the transmission power (e.g., about 100 us) (see 1006). This short period of time can be referred to as first portion of the periodically recurring LTE uplink slot. After that TX FBR can be reconfigured to apply run-time ACLR measurement for the internal loop-back TX signal (see 1008) in the second portion of the periodically recurring LTE uplink slot. If the transmission power is not reaching the threshold (see 1004), TX FBR can be configured earlier for run-time ACLR measurement during the whole LTE uplink slot (see 1010). After deriving the initial ACLR distribution (see 1012), a constant scaling can be applied to derive the power distribution spectrum of the TX actual transmission signal, including the adjacent channel leakage power spectrum (see 1014). Note that the spectrum is band limited by the TX FBR sampling rate fs. Thus, a linear inter- or extrapolation can be applied to extend the adjacent channel leakage power spectrum from fs to the farthest frequency of ISM band fc+Δfmax (see 1016). The TX adjacent channel interference to a requested adjacent band can be computed by integrating the power spectrum within the requested adjacent frequency range (from fn−bw/2 to fn+bw/2) (see 1018). Note that, when transmission power value in the TPC is not changed, the estimated TX adjacent channel interference can be combined over several TPC slots to have better accuracy. The computed TX adjacent channel interference can then be reported to the on-board ISM radio, for example (see 1020).

Figure 11:
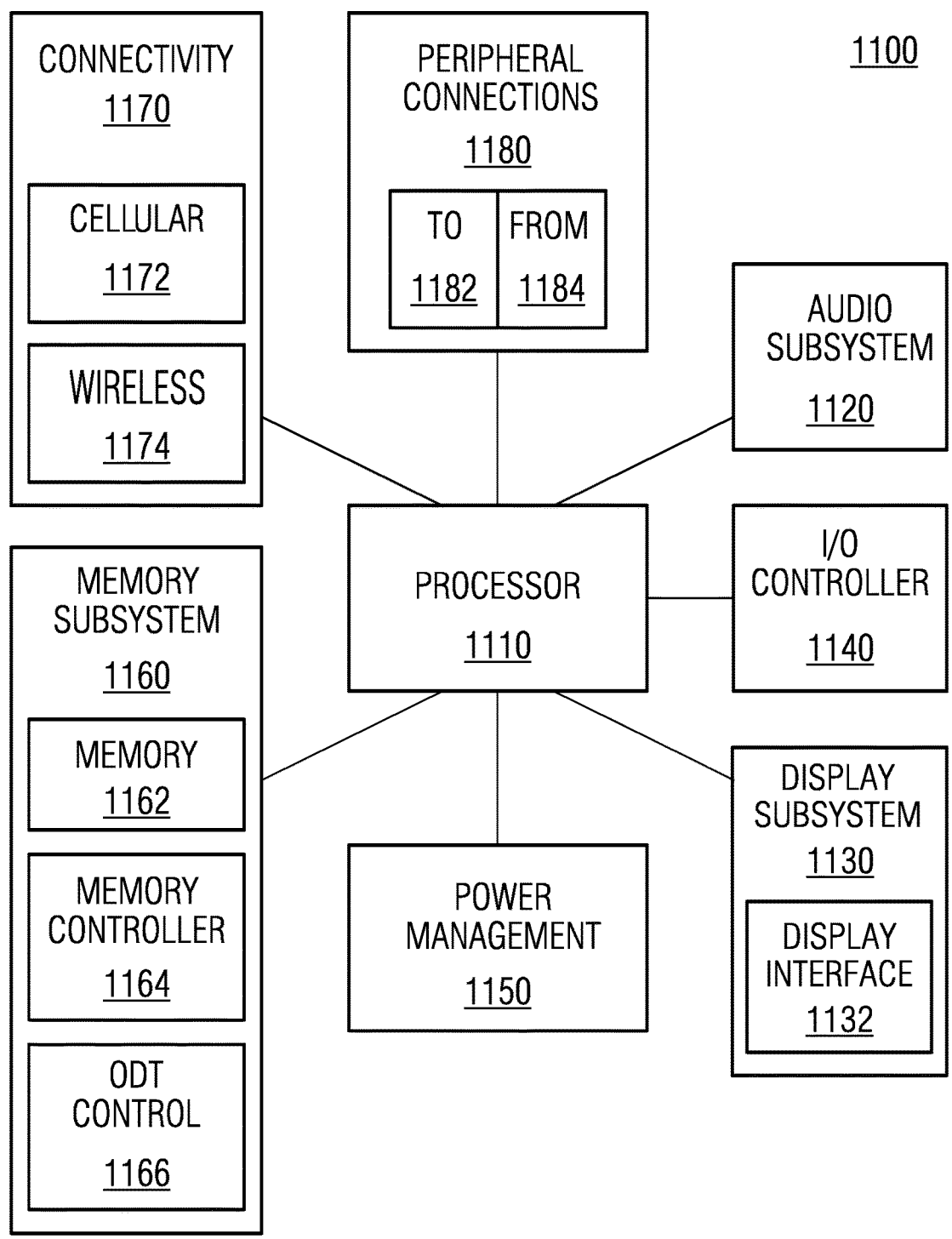
FIG. 11 shows a mobile device implementing examples of the present disclosure.

FIG. 11 is a more detailed block diagram of an example of a device, e.g. a mobile device, in which measuring an adjacent channel leakage-power ratio spectrum of a transmit signal of a user equipment according to example implementations can be implemented. Device 1100 represents a mobile computing device, such as a computing tablet, a mobile phone or smartphone, a wireless-enabled e-reader, wearable computing device, or other mobile device. It will be understood that certain of the components are shown generally, and not all components of such a device are shown in device 1100.

Device 1100 includes processor 1110, which performs the primary processing operations of device 1100. Processor 1110 can include one or more physical devices, such as microprocessors, application processors, microcontrollers, programmable logic devices, or other processing means. The processing operations performed by processor 1110 include the execution of an operating platform or operating system on which applications and/or device functions are executed. The processing operations include operations related to I/O (input/output) with a human user or with other devices, operations related to power management, and/or operations related to connecting device 1100 to another device. The processing operations can also include operations related to audio I/O and/or display I/O.

In one embodiment, device 1100 includes audio subsystem 1120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 1100, or connected to device 1100. In one embodiment, a user interacts with device 1100 by providing audio commands that are received and processed by processor 1110.

Display subsystem 1130 represents hardware (e.g., display devices) and software (e.g., drivers) components that provide a visual and/or tactile display for a user to interact with the computing device. Display subsystem 1130 includes display interface 1132, which includes the particular screen or hardware device used to provide a display to a user. In one embodiment, display interface 1132 includes logic separate from processor 1110 to perform at least some processing related to the display. In one embodiment, display subsystem 1130 includes a touchscreen device that provides both output and input to a user. In one embodiment, display subsystem 1130 includes a high definition (HD) display that provides an output to a user. High definition can refer to a display having a pixel density of approximately 100 PPI (pixels per inch) or greater, and can include formats such as full HD (e.g., 1080 p), retina displays, 4K (ultra high definition or UHD), or others.

I/O controller 1140 represents hardware devices and software components related to interaction with a user. I/O controller 1140 can operate to manage hardware that is part of audio subsystem 1120 and/or display subsystem 1130. Additionally, I/O controller 1140 illustrates a connection point for additional devices that connect to device 1100 through which a user might interact with the system. For example, devices that can be attached to device 1100 might include microphone devices, speaker or stereo systems, video systems or other display device, keyboard or keypad devices, or other I/O devices for use with specific applications such as card readers or other devices.

As mentioned above, I/O controller 1140 can interact with audio subsystem 1120 and/or display subsystem 1130. For example, input through a microphone or other audio device can provide input or commands for one or more applications or functions of device 1100. Additionally, audio output can be provided instead of or in addition to display output. In another example, if display subsystem includes a touchscreen, the display device also acts as an input device, which can be at least partially managed by I/O controller 1140. There can also be additional buttons or switches on device 1100 to provide I/O functions managed by I/O controller 1140.

In one embodiment, I/O controller 1140 manages devices such as accelerometers, cameras, light sensors or other environmental sensors, gyroscopes, global positioning system (GPS), or other hardware that can be included in device 1100. The input can be part of direct user interaction, as well as providing environmental input to the system to influence its operations (such as filtering for noise, adjusting displays for brightness detection, applying a flash for a camera, or other features). In one embodiment, device 1100 includes power management 1150 that manages battery power usage, charging of the battery, and features related to power saving operation.

Memory subsystem 1160 includes memory device(s) 1162 for storing information in device 1100. Memory subsystem 1160 can include nonvolatile (state does not change if power to the memory device is interrupted) and/or volatile (state is indeterminate if power to the memory device is interrupted) memory devices. Memory 1160 can store application data, user data, music, photos, documents, or other data, as well as system data (whether long-term or temporary) related to the execution of the applications and functions of system 1100. In one embodiment, memory subsystem 1160 includes memory controller 1164 (which could also be considered part of the control of system 1100, and could potentially be considered part of processor 1110). Memory controller 1164 includes a scheduler to generate and issue commands to memory device 1162.

Connectivity 1170 includes hardware devices (e.g., wireless and/or wired connectors and communication hardware) and software components (e.g., drivers, protocol stacks) to enable device 1100 to communicate with external devices. The external device could be separate devices, such as other computing devices, wireless access points or base stations, as well as peripherals such as headsets, printers, or other devices.

Connectivity 1170 can include multiple different types of connectivity. To generalize, device 1100 is illustrated with cellular connectivity 1172 and wireless connectivity 1174. Cellular connectivity 1172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 1174 refers to wireless connectivity that is not cellular, and can include personal area networks (such as Bluetooth), local area networks (such as Wi-Fi), and/or wide area networks (such as WiMAX), or other wireless communication, such as NFC. Wireless communication refers to transfer of data through the use of modulated electromagnetic radiation through a non-solid medium. Wired communication occurs through a solid communication medium. Cellular connectivity 1172 and/or wireless connectivity 1174 can implement example transceivers of the present disclosure for measuring an adjacent channel leakage-power ratio spectrum of a transmit signal.

Peripheral connections 1180 include hardware interfaces and connectors, as well as software components (e.g., drivers, protocol stacks) to make peripheral connections. It will be understood that device 1100 could both be a peripheral device ("to" 1182) to other computing devices, as well as have peripheral devices ("from" 1184) connected to it. Device 1100 commonly has a "docking" connector to connect to other computing devices for purposes such as managing (e.g., downloading and/or uploading, changing, synchronizing) content on device 1100. Additionally, a docking connector can allow device 1100 to connect to certain peripherals that allow device 1100 to control content output, for example, to audiovisual or other systems.

In addition to a proprietary docking connector or other proprietary connection hardware, device 1100 can make peripheral connections 1180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

The proposed concepts separate the interference contributions by co-existence LTE TX from other interferences, which can make co-existence LTE TX interference mitigation more accurate without further HW costs. The proposed concepts can minimize the inter-device communications between ISM device and LTE device. Comparing with another existing method which uses static assumptions, the proposed method can provide higher estimation accuracy and does not need to pre-store huge look-up tables.

Although the present disclosure mainly refers to LTE and ISM for exemplary reasons, the skilled person having benefit from the present disclosure will appreciate that the proposed concepts can be extended to apply accurate runtime TX adjacent channel interference estimation for any RATs (for example, 3G, 2G, WIFI, Blue-tooth) instead of LTE.

The following examples pertain to further embodiments.

Example 1 is an apparatus for a wireless communication system, comprising transmitter circuitry configured to generate a transmit signal on an assigned radio channel, and transmitter feedback receiver circuitry coupled to the transmitter circuitry and configured to estimate an amount of transmit signal power that leaks into adjacent radio channels based on a fed back version of the transmit signal.

In Example 2, the transmitter feedback receiver circuitry of Example 1 can optionally be configured to generate transmit signal power measurements for adjusting the transmit power according to received transmit power control commands during a first mode of operation and to estimate the amount of transmit signal power that leaks into adjacent radio channels during a second mode of operation.

In Example 3, the transmitter feedback receiver circuitry of any one of the previous Examples can optionally be configured to generate the transmit signal power measurements during a first portion of a periodically recurring time slot and to measure the amount of transmit signal power that leaks into adjacent radio channels during a second portion of the time slot.

In Example 4, the transmitter feedback receiver circuitry of any one of the previous Examples can optionally be configured to combine different measurements of the amount of transmit signal power that leaks into adjacent radio channels measured in different time slots.

In Example 5, the transmitter feedback receiver circuitry of any one of the previous Examples can optionally be configured to measure the amount of transmit signal power that leaks into adjacent radio channels during a Radio Resource Control connected mode.

In Example 6, the transmitter feedback receiver circuitry of any one of the previous Examples can optionally be configured to generate an ACLR spectrum of the fed back version of the transmit signal.

In Example 7, the transmitter feedback receiver circuitry of Example 6 can optionally be configured to scale the ACLR spectrum in accordance with a signal attenuation experienced by the fed back version of the transmit signal.

In Example 8, the transmitter feedback receiver circuitry of Examples 6 or 7 can optionally comprise Fourier transform circuitry configured to generate the ACLR spectrum based on a Fourier transform of the fed back version of the transmit signal, and/or comprise filter circuitry configured to generate the ACLR spectrum based on filtering the fed back version of transmit signal with different bandpass-filters associated with respective adjacent radio channels.

In Example 9, the ACLR spectrum is bandlimited in accordance with a sampling rate of the transmitter feedback receiver circuitry and the transmitter feedback receiver circuitry of any one of Examples 6 to 8 can optionally be configured to increase a bandwidth of the adjacent channel leakage-power ratio spectrum by extrapolation.

In Example 10, the transmitter feedback receiver circuitry of any one of the previous Examples can optionally comprise an Analog-to-Digital Converter having a sampling rate of at least four times the bandwidth of the assigned radio channel.

In Example 11, the transmitter circuitry and the transmitter feedback receiver circuitry of any one of the previous Examples are conformant with a first Radio Access Technology and the apparatus further comprises transceiver circuitry conformant with at least one second Radio Access Technology.

In Example 12, the transmitter circuitry and the transmitter feedback receiver circuitry can both be coupled to the same controllable local oscillator.

Example 13 is a user equipment for a wireless communication system. The user equipment comprises a first transceiver conformant with a first Radio Access Technology and a second transceiver conformant with a second Radio Access Technology operating in one or more second radio channels adjacent to one or more first radio channels of the first Radio Access Technology. The second transceiver comprises a transmitter configured to generate a transmit signal for an assigned second radio channel and a transmitter feedback receiver coupled to the transmitter and configured to generate an adjacent channel leakage-power ratio spectrum of a fed back version of the transmit signal.

In Example 14, the transmitter feedback receiver of Example 13 can optionally be configured to scale the adjacent channel leakage-power ratio spectrum to compensate for a signal attenuation of the transmitter feedback receiver experienced by the fed back version of the transmit signal.

In Example 15, the adjacent channel leakage-power ratio spectrum is bandlimited in accordance with a sampling rate of the transmitter feedback receiver of any one of Examples 13 or 14 and the transmitter feedback receiver can be configured to increase a bandwidth of the adjacent channel power leakage spectrum by extrapolation.

In Example 16, the transmitter feedback receiver of any one of Examples 13 to 15 can optionally be configured to generate transmit signal power measurements for adjusting a transmit power of the transmitter according to received transmit power control commands during a first portion of a periodically recurring time slot and to generate the adjacent channel leakage-power ratio spectrum during a second portion of the time slot.

Example 17 is a method for measuring an adjacent channel leakage-power ratio spectrum of a transmit signal of a user equipment of a wireless communication system. The user equipment comprises a transmitter configured to generate the transmit signal and a transmitter feedback receiver coupled to the transmitter for feeding back the transmit signal. The method includes, during a first mode of operation of the transmitter feedback receiver, determining a power of the transmit signal based on a fed back transmit signal, and during a second mode of operation of the transmitter feedback receiver, determining the adjacent channel leakage-power ratio spectrum of the transmit signal based on the fed back transmit signal.

In Example 18, the method of Example 17 further optionally includes, in the first mode of operation of the transmitter feedback receiver, generating transmit signal power measurements for adjusting the transmit power according to received transmit power control commands during a first portion of a periodically recurring time slot, and, in the second mode of operation of the transmitter feedback receiver, measuring the adjacent channel leakage-power ratio spectrum during a second portion of the time slot.

In Example 19, the method of Example 18 further optionally includes combining different measurements of the adjacent channel leakage-power ratio spectrum measured in different time slots.

In Example 20, the adjacent channel leakage-power ratio spectrum can optionally be measured during a Radio Resource Control connected mode of the user equipment.

In Example 21, measuring the adjacent channel leakage-power ratio spectrum of any one of Example 17 to 20 can optionally comprise Fourier transforming the fed back transmit signal or filtering the fed back transmit signal with different bandpass-filters associated with respective adjacent radio channels.

In Example 22, the method of any one of Examples 17 to 21 can further optionally include scaling the adjacent channel leakage-power ratio spectrum in accordance with a signal attenuation of the transmitter feedback receiver.

In Example 23, the method of any one of Examples 17 to 22 can further optionally include sampling the fed back transmit signal with a sampling rate of at least four times the bandwidth of an assigned radio channel.

In Example 24, the adjacent channel leakage-power ratio spectrum is bandlimited in accordance with a sampling rate of the transmitter feedback receiver circuitry and the method of any one of Examples 17 to 23 can further optionally include increasing a bandwidth of the adjacent channel leakage-power ratio spectrum able the sampling rate by extrapolation.

In Example 25, the transmitter and the transmitter feedback receiver are conformant with a first Radio Access Technology and the method of any one of Examples 17 to 24 can further optionally include using the adjacent channel leakage-power ratio spectrum to adjust the transmitter with respect to second transceiver circuitry of the user equipment conformant with at least one second Radio Access Technology and/or to adjust the second transceiver circuitry.

In Example 26, the method of any one of Examples 17 to 25 can further optionally include using the same controllable local oscillator for up-converting the transmit signal in the transmitter and for down-converting the fed back transmit signal in the transmitter feedback receiver.

Example 27 is a computer program product comprising a non-transitory computer readable medium having computer readable program code embodied therein, wherein the computer readable program code, when being loaded on a computer, a processor, or a programmable hardware component, is configured to implement a method for measuring an adjacent channel leakage-power ratio spectrum of a transmit signal of a user equipment of a wireless communication system, the user equipment comprising a transmitter configured to generate the transmit signal and a transmitter feedback receiver coupled to the transmitter for feeding back the transmit signal. The method comprises, during a first mode of operation of the transmitter feedback receiver, determining a power of the transmit signal based on a fed back transmit signal, and, during a second mode of operation of the transmitter feedback receiver, determining the adjacent channel leakage-power ratio spectrum of the transmit signal based on the fed back transmit signal.

The skilled person having benefit from the present disclosure will appreciate that the various examples described herein can be implemented individually or in combination.

The aspects and features mentioned and described together with one or more of the previously detailed examples and figures, may as well be combined with one or more of the other examples in order to replace a like feature of the other example or in order to additionally introduce the feature to the other example.

Examples may further be a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. An apparatus for a wireless communication system, comprising:
   transmitter circuitry configured to generate a transmit signal on an assigned radio channel; and
   transmitter feedback receiver circuitry coupled to the transmitter circuitry and configured to estimate an amount of transmit signal power that leaks into adjacent radio channels based on a fed back version of the transmit signal,
   wherein the transmitter feedback receiver circuitry is configured to generate transmit signal power measurements during a first portion of a periodically recurring time slot and to measure the amount of transmit signal power that leaks into adjacent radio channels during a second portion of the time slot.

2. The apparatus of claim 1, wherein the transmitter feedback receiver circuitry is configured to generate the transmit signal power measurements for adjusting the transmit power according to received transmit power control commands during a first mode of operation and to estimate the amount of transmit signal power that leaks into adjacent radio channels during a second mode of operation.

3. The apparatus of claim 1, wherein the transmitter feedback receiver circuitry is configured to combine different measurements of the amount of transmit signal power that leaks into adjacent radio channels measured in different time slots.

4. The apparatus of claim 1, wherein the transmitter feedback receiver circuitry is configured to measure the amount of transmit signal power that leaks into adjacent radio channels during a Radio Resource Control connected mode.

5. The apparatus of claim 1, wherein the transmitter feedback receiver circuitry is configured to generate an adjacent channel leakage-power ratio spectrum of the fed back version of the transmit signal.

6. The apparatus of claim 1,
   wherein the transmitter feedback receiver circuitry comprises Fourier transform circuitry configured to generate the adjacent channel leakage-power ratio spectrum based on a Fourier transform of the fed back version of the transmit signal, or
   wherein the transmitter feedback receiver circuitry comprises filter circuitry configured to generate the adjacent channel leakage-power ratio spectrum based on filtering the fed back version of transmit signal with different bandpass-filters associated with respective adjacent radio channels.

7. The apparatus of claim 5, wherein the transmitter feedback receiver circuitry is configured to scale the adjacent channel leakage-power ratio spectrum in accordance with a signal attenuation experienced by the fed back version of the transmit signal.

8. The apparatus of claim 1, wherein the transmitter feedback receiver circuitry comprises an Analog-to-Digital Converter having a sampling rate of at least four times the bandwidth of the assigned radio channel.

9. The apparatus of claim 5, wherein the adjacent channel leakage-power ratio spectrum is bandlimited in accordance with a sampling rate of the transmitter feedback receiver circuitry and wherein the transmitter feedback receiver circuitry is configured to increase a bandwidth of the adjacent channel leakage-power ratio spectrum by extrapolation.

10. The apparatus of claim 1, wherein the transmitter circuitry and the transmitter feedback receiver circuitry are conformant with a first Radio Access Technology and wherein the apparatus further comprises transceiver circuitry conformant with at least one second Radio Access Technology.

11. The apparatus of claim 1, wherein the transmitter circuitry and the transmitter feedback receiver circuitry are both coupled to the same controllable local oscillator.

12. A user equipment for a wireless communication system, comprising:
- a first transceiver conformant with a first Radio Access Technology;
- a second transceiver conformant with a second Radio Access Technology operating in one or more second radio channels adjacent to one or more first radio channels of the first Radio Access Technology,
- wherein the second transceiver comprises
  - a transmitter configured to generate a transmit signal for an assigned second radio channel, and
  - a transmitter feedback receiver coupled to the transmitter and configured to generate an adjacent channel leakage-power ratio spectrum of a fed back version of the transmit signal,
  - wherein the transmitter feedback receiver is configured to generate transmit signal power measurements for adjusting a transmit power of the transmitter according to received transmit power control commands during a first portion of a periodically recurring time slot and to generate the adjacent channel leakage-power ratio spectrum during a second portion of the time slot.

13. The user equipment of claim 12, wherein the transmitter feedback receiver is configured to scale the adjacent channel leakage-power ratio spectrum to compensate for a signal attenuation of the transmitter feedback receiver experienced by the fed back version of the transmit signal.

14. The user equipment of claim 12, wherein the adjacent channel leakage-power ratio spectrum is bandlimited in accordance with a sampling rate of the transmitter feedback receiver and wherein the transmitter feedback receiver is configured to increase a bandwidth of the adjacent channel power leakage spectrum by extrapolation.

15. A method for measuring an adjacent channel leakage-power ratio spectrum of a transmit signal of a user equipment of a wireless communication system, the user equipment comprising a transmitter configured to generate the transmit signal and a transmitter feedback receiver coupled to the transmitter for feeding back the transmit signal, the method comprising:
- during a first mode of operation of the transmitter feedback receiver, determining a power of the transmit signal based on a fed back transmit signal; and
- during a second mode of operation of the transmitter feedback receiver, determining the adjacent channel leakage-power ratio spectrum of the transmit signal based on the fed back transmit signal,
- in the first mode of operation of the transmitter feedback receiver, generating transmit signal power measurements for adjusting the transmit power according to received transmit power control commands during a first portion of a periodically recurring time slot; and
- in the second mode of operation of the transmitter feedback receiver, measuring the adjacent channel leakage-power ratio spectrum during a second portion of the time slot.

16. The method of claim 15, further comprising combining different measurements of the adjacent channel leakage-power ratio spectrum measured in different time slots.

17. The method of claim 15, wherein the adjacent channel leakage-power ratio spectrum is measured during a Radio Resource Control connected mode of the user equipment.

* * * * *